(12) United States Patent
Chen et al.

(10) Patent No.: US 8,302,499 B2
(45) Date of Patent: Nov. 6, 2012

(54) LINEAR TRANSMISSION SYSTEM WITH A LUBRICATION DEVICE

(75) Inventors: Yan-Yu Chen, Taichung (TW); Zong-Sian Jiang, Taichung (TW); Chia-Min Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 530 days.

(21) Appl. No.: 12/641,303

(22) Filed: Dec. 17, 2009

(65) Prior Publication Data

US 2011/0146430 A1   Jun. 23, 2011

(51) Int. Cl.
*F16H 3/06* (2006.01)
*F16H 27/02* (2006.01)
*F16H 29/02* (2006.01)
*F16H 29/20* (2006.01)

(52) U.S. Cl. ...................... 74/89.44; 74/89.43
(58) Field of Classification Search ............. 74/89.23, 74/89.34, 89.44; 184/5, 100
See application file for complete search history.

(56) References Cited

U.S. PATENT DOCUMENTS

| 5,454,278 A * | 10/1995 | Kasuga ................. 74/89.33 |
| 5,782,135 A * | 7/1998 | Kondo et al. ........... 74/89.44 |
| 5,809,838 A * | 9/1998 | Miyaguchi et al. ....... 74/89.44 |
| 6,364,058 B1 * | 4/2002 | Nishide et al. ............. 184/5 |
| 6,619,148 B2 * | 9/2003 | Nishide .................. 74/89.44 |
| 7,634,952 B2 * | 12/2009 | Chen et al. .............. 74/89.44 |
| 8,215,840 B2 * | 7/2012 | Hsiao ....................... 384/13 |

* cited by examiner

*Primary Examiner* — Troy Chambers
*Assistant Examiner* — Gregory Prather (57) ABSTRACT

A transmission system with a lubrication device is disclosed. The lubrication device is defined with an accommodation trough and an oil hole. In the accommodation trough is disposed a guiding assembly. The guiding assembly cooperates with the accommodation trough to define an oil storage space for accommodation of lubricating grease. The oil storage space is in communication with the oil hole. A power module is connected to the guiding assembly to drive the guiding assembly at regular intervals to make the lubricating grease overflow to the linear transmission system through the oil hole to perform the lubrication.

8 Claims, 9 Drawing Sheets

LINEAR TRANSMISSION SYSTEM WITH A LUBRICATION DEVICE

BACKGROUND OF THE INVENTION

1. Field of the Invention

The present invention relates to an accessory for a linear transmission system, and more particularly to a lubrication device which is stored with lubricating grease.

2. Description of the Prior Art

A ball screw essentially comprises a nut, a screw shaft and plural balls capable of rolling between the nut and the screw shaft. With the balls, the nut and the screw shaft can slide relative to each other. The ball screw is widely applied onto various precise mobile machines due to its advantages of high smoothness and accuracy, such as various fine machining or semiconductor equipments. Therefore, lubrication to the helical groove is quite important. However, if the ball screw lacks lubrication for a long period, the friction between the nut and the screw shaft will be consequently increased, thus accelerating the abrasion of the ball screw.

In order to effectively reduce the abrasion of the ball screw caused by friction, lubrication systems for the conventional balls screws are divided into two types: the first type of lubrication system is stored with lubricating oil, disposed at both ends of the nut first, and is provided with an oil absorbent which is used to directly apply the lubricating oil onto the screw shaft to lubricate the helical groove thereof; the second type of lubrication system is provided with two oil-containing wipers which are disposed at both ends of the nut to lubricate the helical groove in the screw shaft by being in direct contact with the surface of the screw shaft.

The existing self-lubricating screw shafts are normally equipped with an external accessory which is filled with lubricant-soaked wool felt and fixed to the outside of the nut, so that when the screw shaft rotates relative to the nut, the wool felt will apply the lubricating oil into the helical groove of the screw shaft to lubricate the screw shaft. Since most of the semiconductor industries require a dust free environment, this lubrication method has to use the lubricating oil as lubricant, however, the lubricating oil is liquid and prone to producing particles which will adversely affect the cleanness of the environment, therefore, the existing designs are inapplicable to the semiconductor industries which require highly clean environment.

Figure 9:
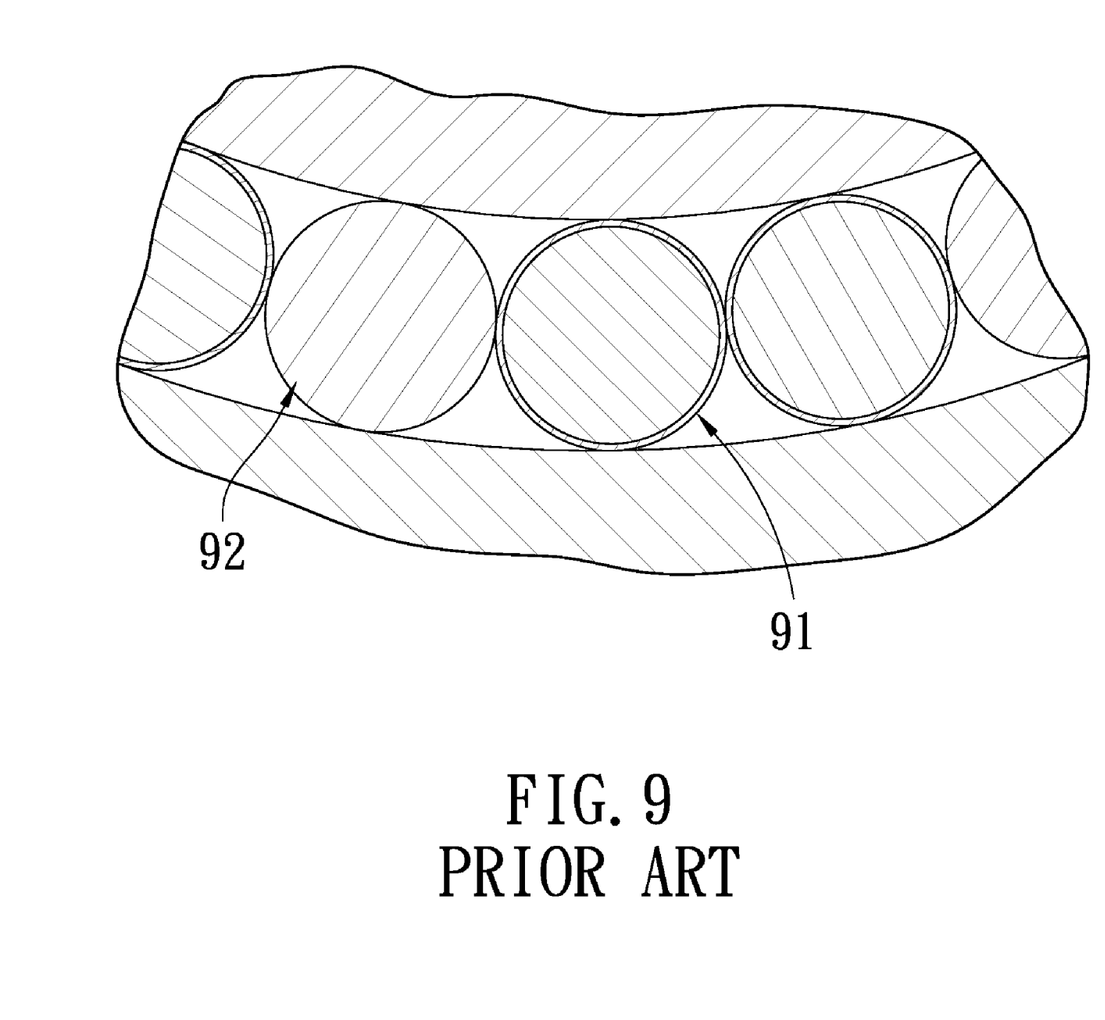
FIG. 9 is a cross-sectional view showing a conventional lubrication system.

To solve the above problems, referring to FIG. 9, a lubrication system disclosed in U.S. Pat. No. 5,782,135 is provided with plural spacing balls 92 between rolling elements 91, and the spacing balls 92 are made of solid lubricating material (such as molybdenum disulfide, gold, silver, lead or PTFE), so that when the ball screw is in use, lubricating debris will be produced through abrasion of the spacing balls 92 against the rolling elements 91 to lubricate the rolling elements 91, the screw shaft and the nut. However, the above lubrication system also suffers from the following drawbacks in practice:

1. The spacing balls will lose the lubrication function after abrasion, and if the spacing balls are reduced to a certain scale through abrasion, stuck fault will be caused, interfering with the normal operation of the rolling elements.

2. Due to using the spacing balls to offer the lubrication function, the lubrication efficiency is unstable and difficult to control, causing insufficient lubrication which shortens the service life of screw shaft.

In addition, if lubricating grease replaces lubricating oil as lubricant, it can be used in a highly clean environment of the semiconductor industry, such as clean room, but the existing lubrication systems all need an external power source to push the lubricating grease into the interior of the ball screw (since the flowability of the lubricating grease is low, external power is needed), so that additional devices are needed to supply the power, thus occupying large space while increasing the equipment cost.

The present invention has arisen to mitigate and/or obviate the afore-described disadvantages.

SUMMARY OF THE INVENTION

The primary objective of the present invention is to provide a linear transmission system with a lubrication device which utilizes the lubricating grease to lubricate the linear assembly, and the lubricating device which is filled with the lubricating grease can transmit the lubricating grease into the linear transmission system to offer the lubrication function without using an external power source.

In order to achieve the above objective, a linear transmission system with a lubrication device in accordance with the present invention comprises: an elongated shaft, a movable body, plural rolling elements, a circulating assembly, a lubrication device and a power module.

The elongated shaft is defined with a rolling groove in an outer surface thereof.

The movable body is disposed on the elongated shaft and allowed to move back and forth along the elongated shaft, the movable body is defined with a rolling groove opposite the rolling groove of the elongated shaft, and the rolling groove of the elongated shaft cooperates with the rolling groove of the movable body to define a loaded path.

The plural rolling elements are disposed in the loaded path.

The circulating assembly is disposed on the movable body and defined with a circulating passage for circulation of the rolling elements.

The lubrication device is disposed on the movable body and defined with an accommodation trough and an oil hole, in the accommodation trough is disposed a guiding assembly, the guiding assembly cooperates with the accommodation trough to define an oil storage space for accommodation of lubricating grease, the oil storage space is in communication with the oil hole.

The power module is connected to the guiding assembly to drive the guiding assembly at regular intervals.

Further, the power module includes a power supply, a controller and a motor, the power supply supplies power to the controller, and the controller drives the motor at regular intervals.

The lubrication device includes a main body and a power box, and the main body is C-shaped in cross section, the power box is disposed in an opening of the C-shaped main body to make the lubrication device form a circular structure, the accommodation trough is defined in the main body, and the main body is further defined with a driving space for accommodation of the controller and the motor, the power box is defined with an accommodation space for accommodation of the power supply.

The guiding assembly is connected to an axle of the motor and provided with a helical blade which cooperates with the accommodation trough to define the oil storage space, and the oil storage space is a helical space.

The movable body can be defined with an accommodation hole for accommodation of the power module, alternatively, the accommodation hole of the movable body can also be provided for accommodation of the power supply and the controller, and the motor is disposed in the lubrication device.

Alternatively, the lubrication device can also be C-shaped in cross section.

The guiding assembly includes a screw shaft and a spacer plate, one end of the screw shaft is connected to an axle of the motor, the spacer plate cooperates with the accommodation trough to define the oil storage space, the spacer plate is defined with a threaded hole to be screwed with the screw shaft, the screw shaft rotates to drive the spacer plate to move axially.

The oil hole can be in communication to a surface of the elongated shaft, or can also be connected to an oil passage of the movable body which is in communication to an inner surface of the movable body.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-4, a linear transmission system with a lubrication device in accordance with a first embodiment of the present invention comprises an elongated shaft 1, a movable body 2, plural rolling elements (not shown), a circulating assembly (not shown), a lubrication device 3, and a power module.

The elongated shaft 1 is defined with a rolling groove 11 in an outer surface thereof.

The movable body 2 is disposed on the elongated shaft 1 and allowed to move back and forth along the elongated shaft 1. The movable body 2 is defined with a rolling groove (not shown) opposite the rolling groove 11 in such a manner that the rolling groove of the movable body 2 cooperates with the rolling groove 11 to define a loaded path.

The plural rolling elements (not shown) are disposed in the loaded path. The circulating assembly (not shown) is disposed on the movable body 2 and defined with a circulating passage for circulation of the rolling elements.

The lubrication device 3 includes a main body 31 and a power box 32. The main body 31 is C-shaped in cross section, and the power box 32 is disposed in an opening of the C-shaped main body 31 to make the lubrication device 3 form a circular structure. The main body 31 is defined with an accommodation trough 312, a driving space 311 and an oil hole 313. The accommodation trough 312 is provided for accommodation of a guiding assembly 6 which is provided with a helical blade 61. The helical blade 61 cooperates with the accommodation trough 312 to define a helical oil storage space 30 for accommodation of lubricating grease. The oil storage space 30 is in communication with the oil hole 313. The power box 32 is defined with an accommodation space 321.

The power module includes a power supply D, a controller E and a motor F. The motor F and the controller E are disposed in the driving space 311 (alternatively, only the motor F is disposed in the driving space 311 while the controller E is disposed in the accommodation space 321), and an axle of the motor F is connected to the guiding assembly 6. The power supply D is disposed in the accommodation space 321 and provided to supply power to the controller E. The controller E is used to drive the motor F to run at regular intervals, and consequently the motor F will drive the guiding assembly 6 to rotate. While the guiding assembly 6 rotates, the helical blade 61 of the guiding assembly 6 will drive the lubricating grease to move, making the lubricating grease overflow onto the surface of the elongated shaft 1 through the oil hole.

Figure 5:
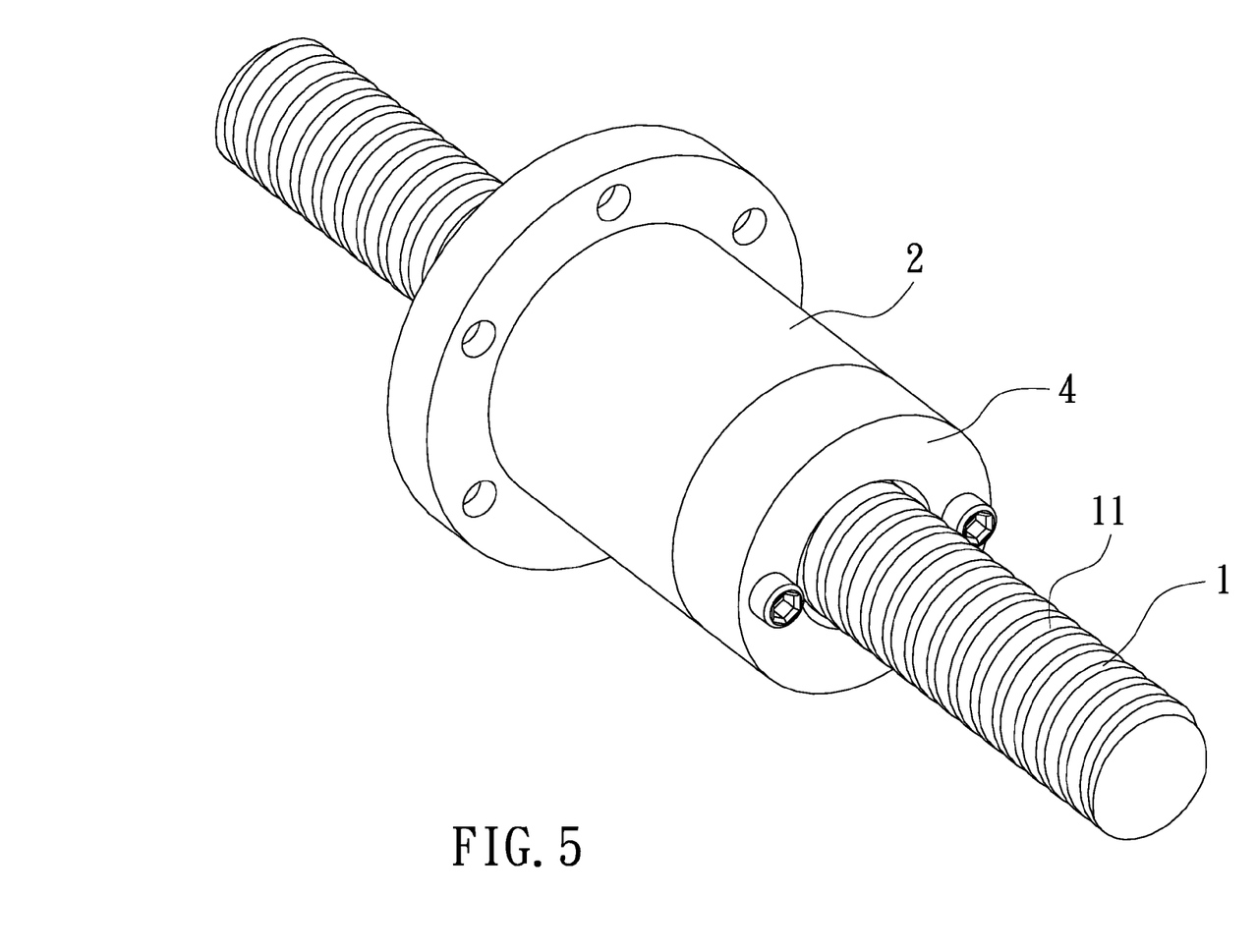
FIG. 5 is a perspective view of a linear transmission system with a lubrication device in accordance with a second embodiment of the present invention.
Figure 6:
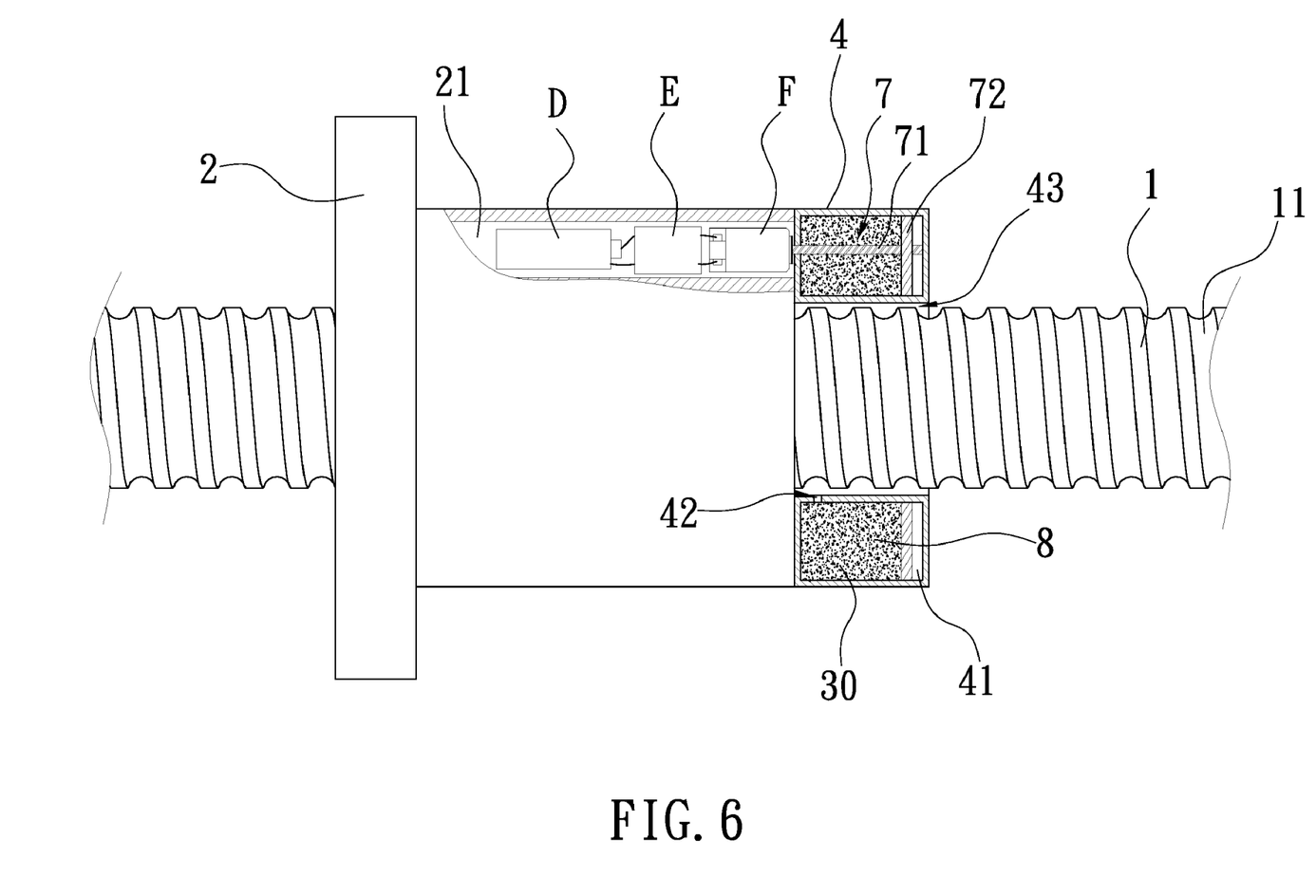
FIG. 6 is a partial cross-sectional view of the linear transmission system with a lubrication device of FIG. 5, showing that the lubrication device is full of the lubricating grease.
Figure 7:
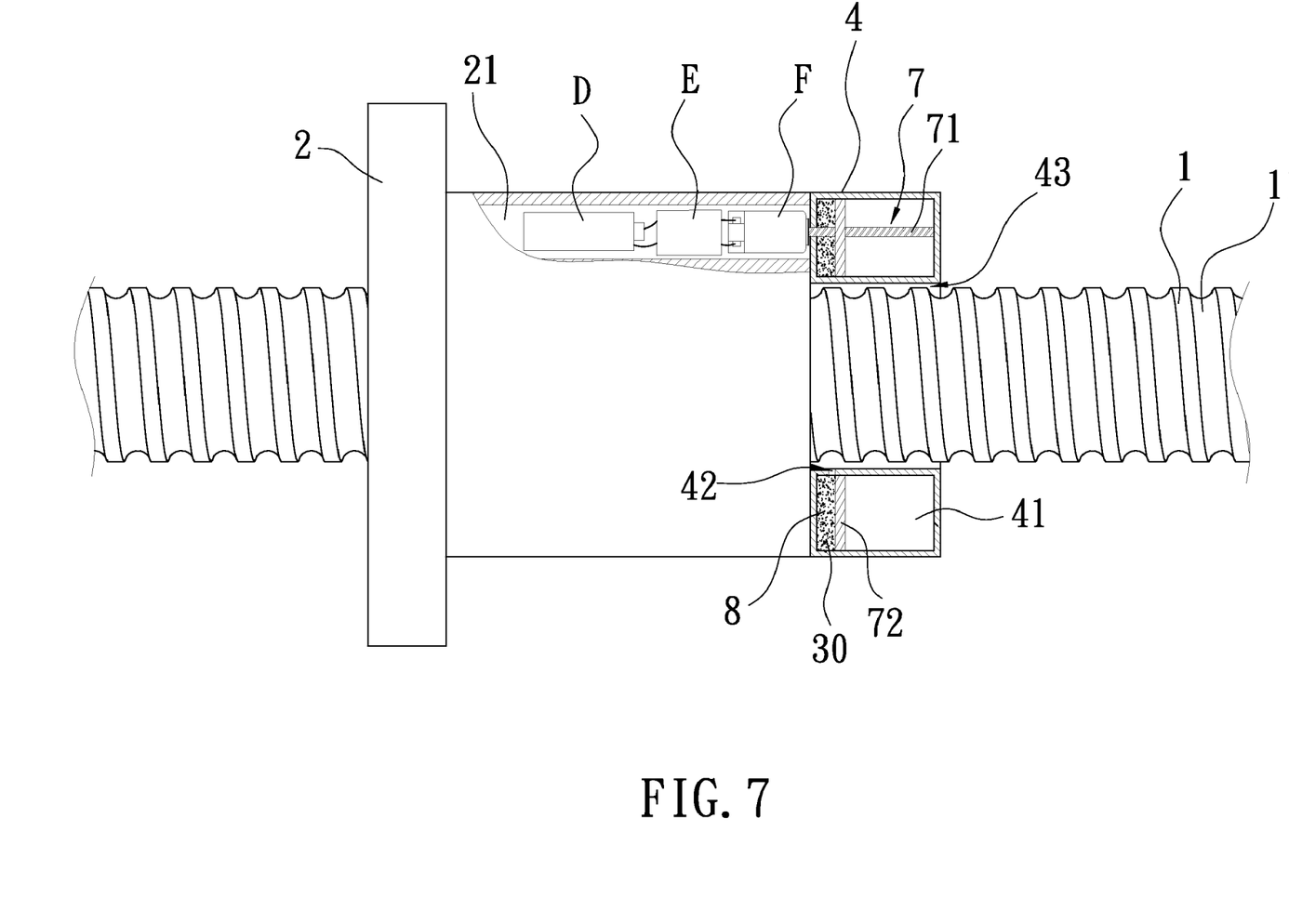
FIG. 7 is a cross-sectional view of the linear transmission system with a lubrication device of FIG. 5, showing that the lubricating grease is almost used up.

Referring to FIGS. 5-7, a linear transmission system with a lubrication device in accordance with a second embodiment of the present invention comprises an elongated shaft 1, a movable body 2, plural rolling elements (not shown), a circulating assembly (not shown), a lubrication device 4 and a power module.

The elongated shaft 1 is defined with a rolling groove 11 in an outer surface thereof.

The movable body 2 is disposed on the elongated shaft 1 and allowed to move back and forth along the elongated shaft 1. The movable body 2 is defined with a rolling groove (not shown) opposite the rolling groove 11 in such a manner that the rolling groove of the movable body 2 cooperates with the rolling groove 11 to define a loaded path. The movable body 2 is defined with an accommodation hole 21.

The plural rolling elements (not shown) are disposed in the loaded path.

The circulating assembly (not shown) is disposed on the movable body 2 and defined with a circulating passage for circulation of the rolling elements.

The lubrication device 4 is C-shaped (or circular) in cross section. The lubrication device 4 is disposed on the movable body 2 and defined with an accommodation trough 41 and an oil hole 42. The lubrication device 4 is further defined with a through hole 43 for insertion of the elongated shaft 1. In the accommodation trough 41 is disposed a guiding assembly 7 including a screw shaft 71 and a spacer plate 72. The spacer plate 72 is defined with a threaded hole to be screwed with the screw shaft 71. The screw shaft 71 rotates to drive the spacer plate 72 to move axially. The spacer plate 72 cooperates with the accommodation trough 41 to define an oil storage space 30 for accommodation of the lubricating grease 8. The oil storage space 30 is in communication with the oil hole 42.

The power module includes a power supply D, a controller E and a motor F. The power module is disposed in the accommodation hole 21 of the movable body 2. An axle of the motor F is connected to one end of the screw shaft 71. The power supply D is provided to supply power to the controller E. The controller E drives the motor F to run at regular intervals, consequently the motor F will drive the screw shaft 71 to rotate. The screw shaft 71 rotates to drive the spacer plate 72 to move, and thus, the movement of the spacer plate 72 will reduce the volume of the oil storage space 30 to make the lubricating grease 8 overflow through the oil hole 42 to perform the lubrication.

Figure 8:
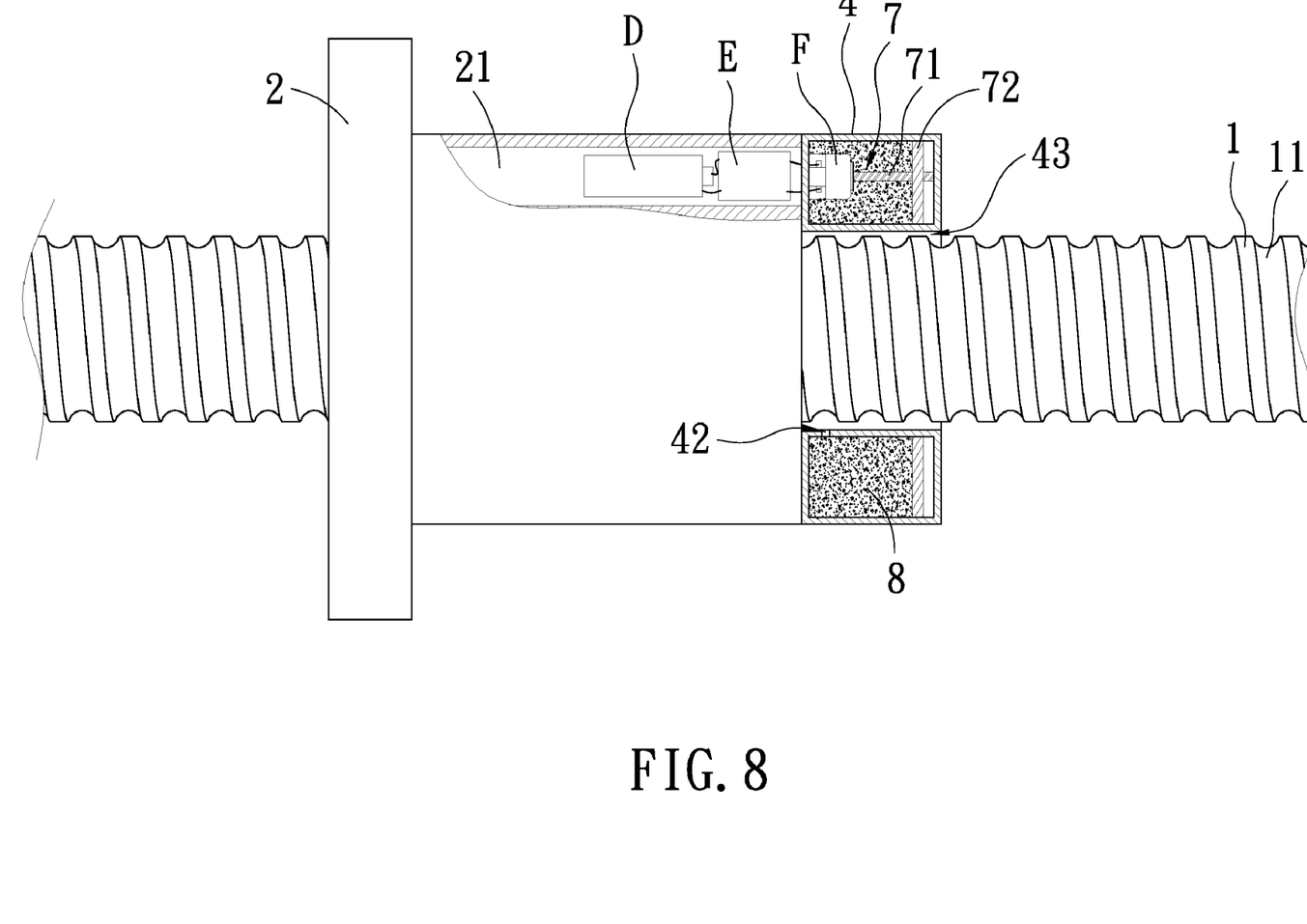
FIG. 8 is a cross-sectional view of a linear transmission system with a lubrication device in accordance with a third embodiment of the present invention, showing the motor is disposed in the lubrication device.

Additionally, as shown in FIG. 8, the motor F of the power module can also be installed in the oil storage space 30 of the lubrication device 4, and the power supply D and the controller E can also be installed in the accommodation hole 21 of the movable body 2.

Additionally, an alarm light is disposed on the present invention to make the user know if the power supply D is used up.

Figure 1:
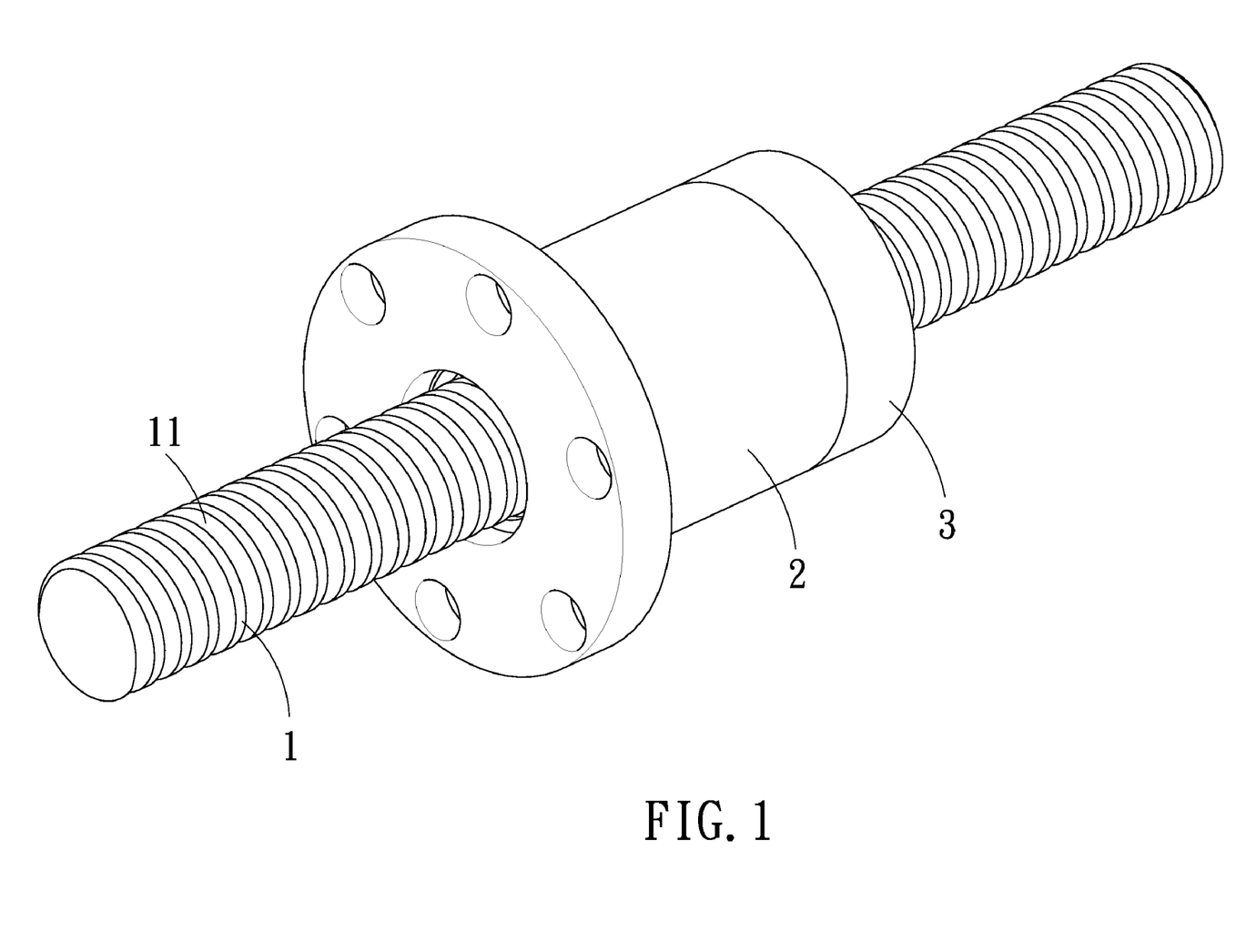
FIG. 1 is a perspective view of a linear transmission system with a lubrication device in accordance with a first embodiment of the present invention.
Figure 2:
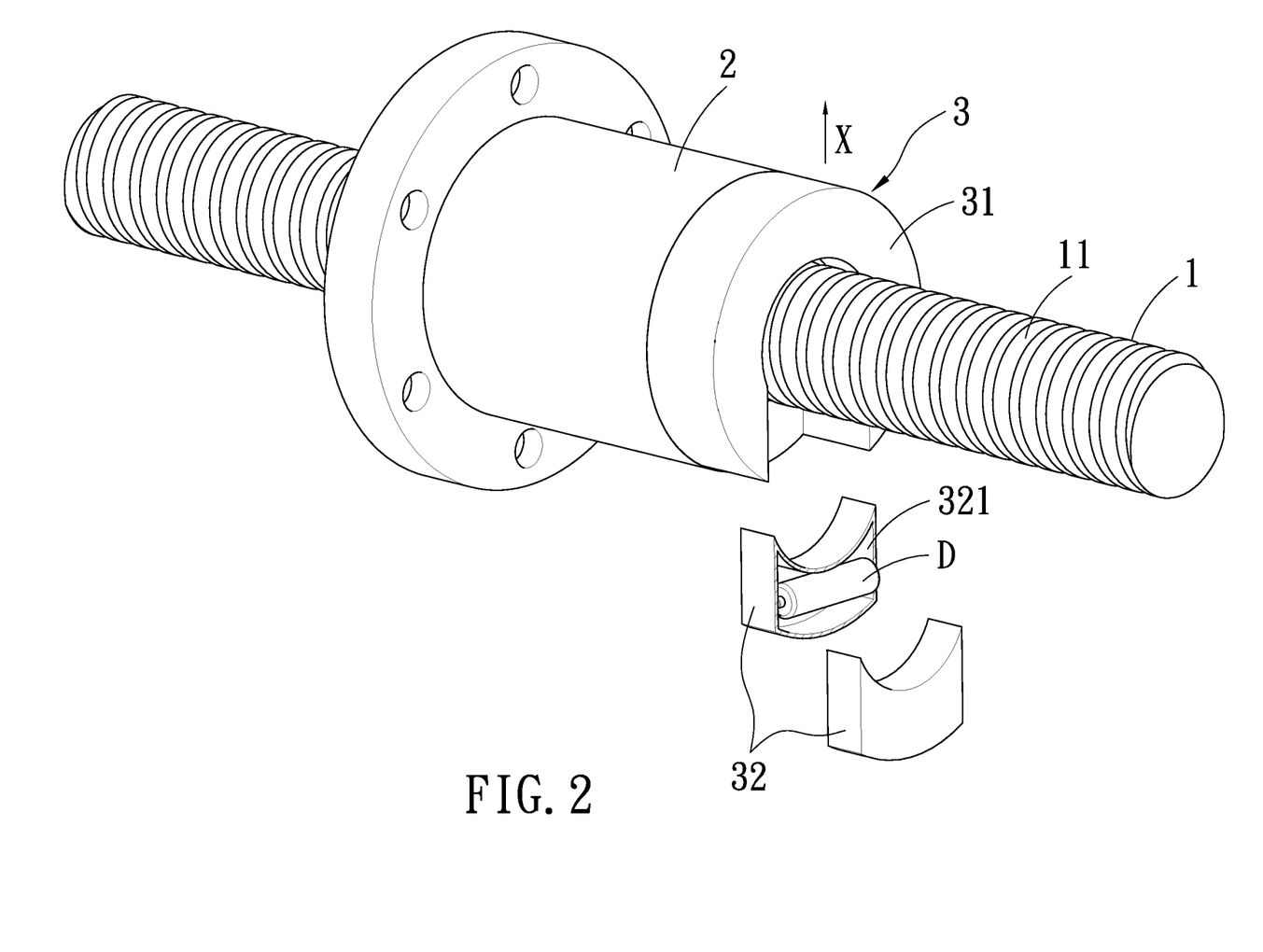
FIG. 2 is a perspective view showing that the power box is removed from the main body of the lubrication device of FIG. 1.
Figure 3:
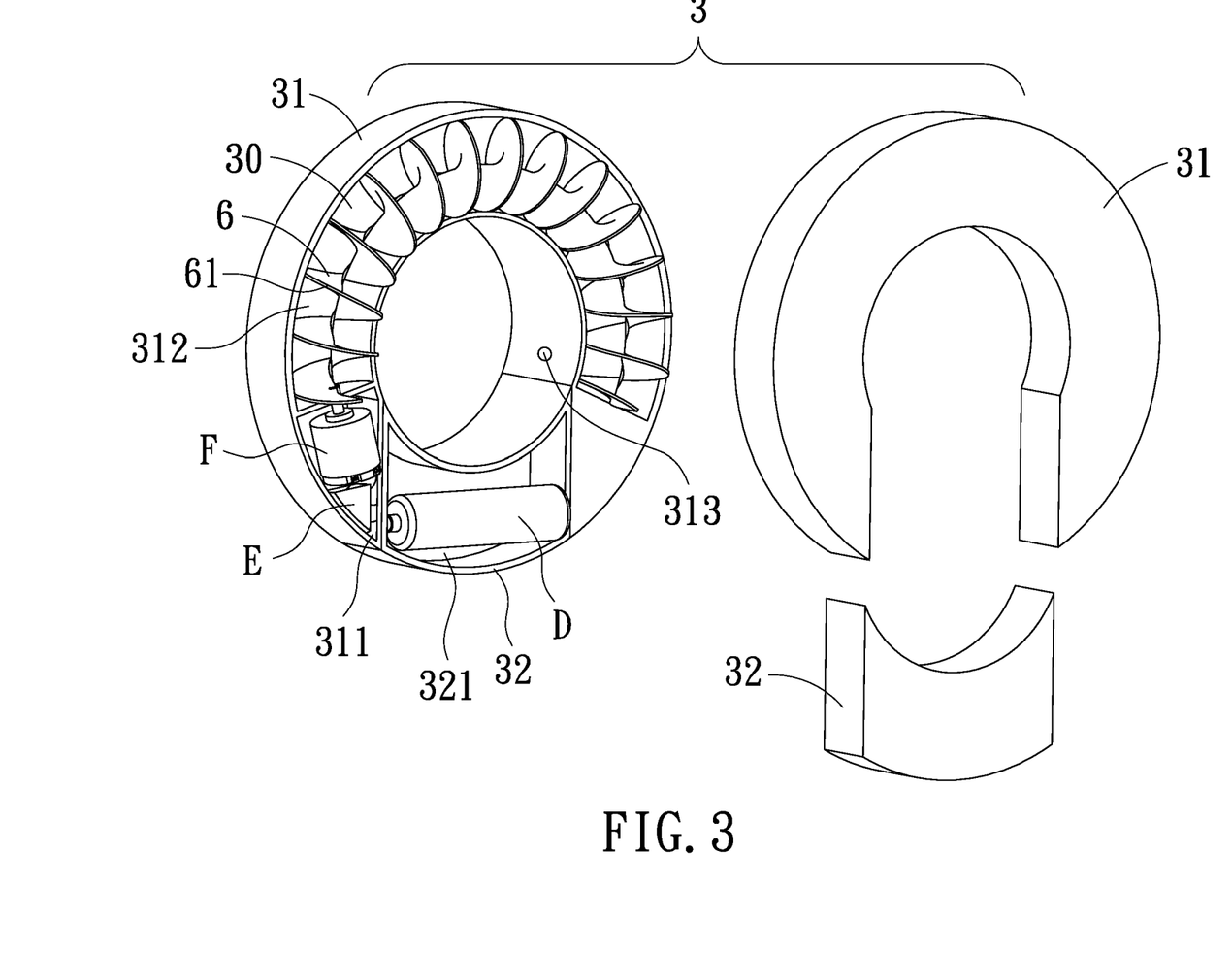
FIG. 3 is a perspective view showing an inner configuration of the lubrication device of FIG. 1.
Figure 4:
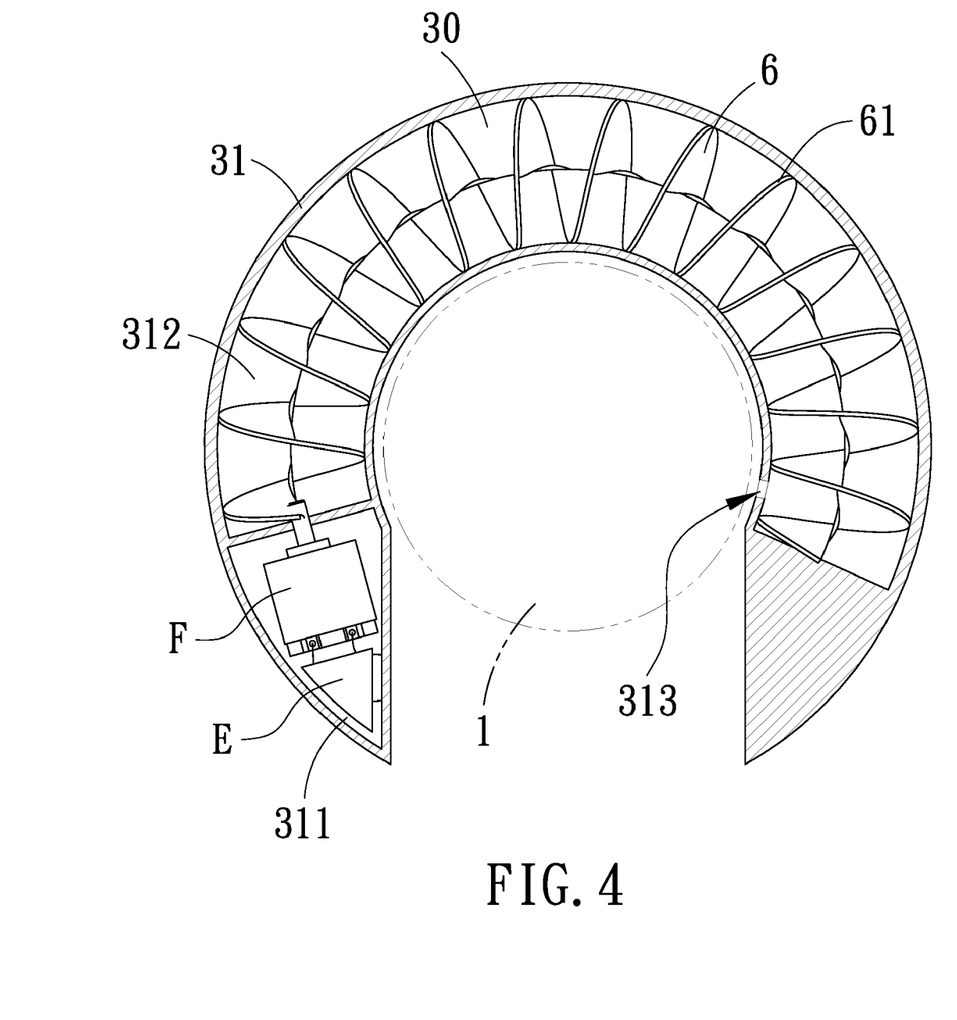
FIG. 4 is a front view showing the inner configuration of the lubrication device of FIG. 1.

Additionally, the lubrication device of the present invention is preferably C-shaped in cross section for facilitating replacement, as shown in FIG. 2, the lubrication device can be removed in the direction of X.

As known from the above description, the present invention has the following advantages:

1. The lubrication device of the present invention can utilize the power module to transmit the lubricating grease to the elongated shaft without connecting to any external power source, and the power supply of the power module can be replaced whether it is installed on the movable body or the lubrication device, thus facilitating the replacement of the power supply.

2. The lubrication device of the present invention is simple in configuration and can be made by mould, so that it is available for mass production.

3. The lubrication device of the present invention is filled with the lubricating grease, so it can be applied to any environment (because the lubricating grease has low volatility and low flowability).

While we have shown and described various embodiments in accordance with the present invention, it is clear to those skilled in the art that further embodiments may be made without departing from the scope of the present invention.

What is claimed is:

1. A linear transmission system with a lubrication device comprising:
   an elongated shaft being defined with a rolling groove in an outer surface thereof;
   a movable body being disposed on the elongated shaft and allowed to move back and forth along the elongated shaft, the movable body being defined with a rolling groove opposite the rolling groove of the elongated shaft, the rolling groove of the elongated shaft cooperating with the rolling groove of the movable body to define a loaded path;
   plural rolling elements being disposed in the loaded path;
   a circulating assembly being disposed on the movable body and defined with a circulating passage for circulation of the rolling elements;
   a lubrication device being disposed on the movable body and defined with an accommodation trough and an oil hole, in the accommodation trough being disposed a guiding assembly, the guiding assembly cooperating with the accommodation trough to define an oil storage space for accommodation of lubricating grease, the oil storage space being in communication with the oil hole; and
   a power module being connected to the guiding assembly to drive the guiding assembly at regular intervals;
   wherein the power module is disposed in the lubrication device and includes a power supply, a controller and a motor, the power supply supplies power to the controller, and the controller drives the motor at regular intervals.

2. The linear transmission system with a lubrication device as claimed in claim 1, wherein the lubrication device includes a main body and a power box, the main body is C-shaped in cross section, the power box is disposed in an opening of the C-shaped main body.

3. The linear transmission system with a lubrication device as claimed in claim 2, wherein the accommodation trough is defined in the main body, and the main body is further defined with a driving space for accommodation of the controller and the motor.

4. The linear transmission system with a lubrication device as claimed in claim 2, wherein the accommodation trough is defined in the main body, and the main body is further defined with a driving space for accommodation of the motor.

5. The linear transmission system with a lubrication device as claimed in claim 3, wherein the power box is defined with an accommodation space for accommodation of the power supply.

6. The linear transmission system with a lubrication device as claimed in claim 4, wherein the power box is defined with an accommodation space for accommodation of the controller and the power supply.

7. The linear transmission system with a lubrication device as claimed in claim 1, wherein the guiding assembly is connected to an axle of the motor and provided with a helical blade which cooperates with the accommodation trough to define the oil storage space, the oil storage space is a helical space.

8. The linear transmission system with a lubrication device as claimed in claim 1, wherein the oil hole is in communication to a surface of the elongated shaft.

* * * * *